United States Patent [19]

Crookshanks

[11] Patent Number: 4,719,619

[45] Date of Patent: Jan. 12, 1988

[54] SYNCHRONIZER FOR COMMUNICATIONS PROCESSOR

[75] Inventor: Rex J. Crookshanks, Palos Verdes Estates, Calif.

[73] Assignee: Hughes Aircraft Company, Los Angeles, Calif.

[21] Appl. No.: 882,066

[22] Filed: Jul. 3, 1986

[51] Int. Cl.$^4$ ............................................... H04J 4/00
[52] U.S. Cl. ...................................................... 370/70
[58] Field of Search ..................................... 370/50, 70

[56] References Cited

U.S. PATENT DOCUMENTS 4,304,000 12/1981 Bonnerot et al. ..................... 370/50
4,590,595 5/1986 Morimura .............................. 370/50

Primary Examiner—Douglas W. Olms
Assistant Examiner—Min Jung
Attorney, Agent, or Firm—Steven M. Mitchell; Mark J. Meltzer; A. W. Karambelas

[57] ABSTRACT

A signal processor (11), such as a spectrum analyzer or SAW demodulator, defines a signal stream from a frequency division multiplexed (FDM) input (13) to a time division multiplexed (TDM) output (41). The signal stream includes a bivariate processor (23) for applying a function to the through-going signal.

The function is produced by a function generator (37) in response to a trigger (33) located remotely from the signal stream. To ensure timely convergence of signal and function, a phase-locked loop based on on/off modulated marker tones $f_H$ and $f_L$ is provided. The phase-locked loop includes an amplitude detector (27) for detecting the amplitudes of marker pulses which are transformed marker tone segments. The amplitudes are compared by a comparator (29) to form a discriminate which regulates a timing generator (31) which, thus, synchronizes the frequency sweep trigger.

12 Claims, 8 Drawing Figures

SYNCHRONIZER FOR COMMUNICATIONS PROCESSOR

BACKGROUND OF THE INVENTION

The present invention relates to communications systems, and, more particularly, to a synchronization scheme for frequency division multiplexed communications.

Frequency division multiplexed (FDM) signals are characterized by a frequency band constituted by many signal channels occupying a respective sub-bandwidths. Signals carried by the individual channels can be encoded through a variety of schemes, e.g. frequency shift keying (FSK) or phase shift keying (PSK). Each signal comprises a stream of encoded bits characterized by a predetermined shared symbol period.

A system for processing FDM signals can include several components which need to be synchronized in some way with the FDM signal. Such synchronization can be fairly straightforward when the event to be synchronized can be initiated at the signal stream. In such a case, synchronization can be triggered using signal transitions within the FDM stream itself.

However, where the event to be synchronized occurs remotely from the FDM stream, synchronization can be more difficult. This is especially true where one or both of the FDM stream and the event to be synchronized encounter intermediate processing prior to convergence. In such a case, even when synchronization is achieved, it can be difficult to maintain due to timing changes such as can be caused by temperature variations or system aging.

By way of example, a frequency sweep must be synchronized with the FDM symbol periods in a surface acoustic wave (SAW) demodulator for converting received FDM signals to time division multiplexed (TDM) signals. The SAW demodulator can include three reflective array compressors (RACs) for time-dispersing signals as a function of frequency. An input RAC time-staggers one set of symbol segments of the channels in an FDM signal. The staggered segments are then frequency swept to produce a sequence of frequency sweeps, each sweep corresponding to a respective channel's symbol segment. An output RAC compresses these sweeps into a series of TDM pulses, each pulse reflecting the content of the corresponding channel's symbol segment.

For this FDM-to-TDM conversion to be performed reliably, the frequency sweep must be synchronized with the FDM signal in its staggered form at the exit of the input RAC. The frequency sweep itself can be formed by generating a pulse, then time dispersing the pulse as a function of frequency using a frequency sweep RAC, and then multiplying this sweep with the staggered FDM signal. The challenge is to generate the pulse at the right time so that the sweep and FDM signal converge with the correct timing.

The problem is that the delays introduced by the various RACs are variable and generally not precisely known at the outset. What is needed is a reliable scheme for synchronizing the sweep that can compensate timing changes due to temperature and other factors. Generally, what is needed is a reliable approach to synchronizing FDM processing events which themselves undergo processing or other delays prior to converging with the FDM stream.

SUMMARY OF THE INVENTION

The present invention implements synchronization by introducing alternating high and low frequency marker tones into an FDM signal prior to convergence with a synchronization-requiring event, and then completing conversion to TDM after convergence. Comparison of the amplitudes of pulses corresponding to the marker tones yields a discriminate effecting synchronization through a phase-locked loop Thus, the present invention provides a system including means for receiving an FDM signal having a predetermined bandwidth and means for processing, at a predetermined point of convergence within the system, a segment of the FDM signal in response to a processing event requiring synchronization. The system includes means for alternately introducing marker tones above and below the FDM bandwidth prior to the point of convergence and means for effecting or completing conversion of the marked signal to a TDM signal. Sampling and comparing means are provided for detecting and comparing pulses corresponding to the marker tones to form a discriminate. A phase-locked loop uses this discriminate to adjust the triggering of the processing event to approach and effect synchronization.

In one application of the present invention, a SAW demodulator applies a frequency sweep requiring synchronization at the point of convergence with the onset of a symbol segment of an FDM signal. Constant amplitude marker tones are introduced at frequencies just above and below the bandwidth of the FDM signal. The spacing of the marker tones can be set empirically to minimize the total bandwidth occupied while avoiding interference due to spreading with the FDM channels. The marker tones are activated on alternating 50% duty cycles so that each marker tone segment extends over half the duration of two adjacent symbol segments. Thus, each symbol segment coincides with half a high marker tone segment and half a low marker tone segment.

The marked segments are staggered, swept and compressed to form a TDM output. Each TDM segment has pulses at the beginning and end corresponding to the marker tones. If the sweep is properly synchronized, these marker pulses have the same amplitude. If the sweep is not synchronized, comparison of the marker pulse amplitudes yields a discriminate. The discriminate can, for example, be used to regulate an oscillator which in turn determines the triggering time for the frequency sweep, thus completing a phase-locked loop and providing for synchronization of the sweep with symbol segments.

In an alternate embodiment, the marker tones are dithered, each marker tone segment being substantially coextensive with a symbol segment. A complete dither cycle includes four symbol segments. These cycles are processed as above using a more elaborate discriminate, as disclosed below.

An advantage of the dither approach is that substantially all the marker tone energy in any given segment is dedicated to one, rather than both, of the marker tones. This makes for better definition at the TDM output. The better definition allows the marker tones to be more closely spaced with respect to the FDM band. Thus, more of the system bandwidth is available for communications channels.

In either case, the discriminates drive a phase-locked loop ensuring proper synchronization of a remote trigger. Thus, the system is self-synchronizing and can adjust to timing changes due to aging and temperature effects. Accordingly, the present invention provides for an improved satellite-based FDM receiver and processing station.

DETAILED DESCRIPTION OF THE PREFERRED EMBODIMENTS

Figure 1:
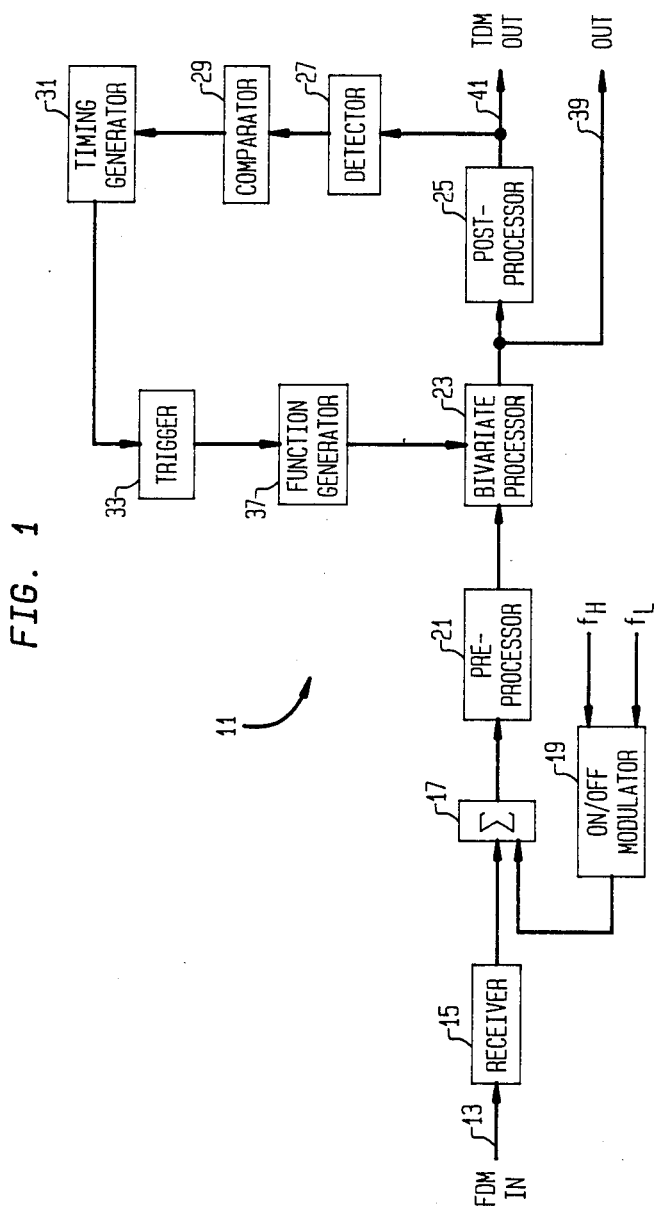
FIG. 1 is a block diagram of a signal processor employing corrective feedback timing in accordance with the present invention.

In accordance with the present invention, a signal processing system 11 for an incoming FDM signal 13 includes a signal receiver 15, a signal pre-processor 21, and a bivariate processor 23. The bivariate processor 23 produces a first system output 39 which is the result of a bivariate operation on the through-going signal and a function. This function is the output of a function generator 37 in response to a signal from a trigger 33, which is, in turn, responsive to a timing generator 31.

For the signal processor 11 to perform properly, it is necessary for the function generator 37 to output its function in proper synchronization with the incoming FDM signal 13. For example, the onset of the function as it appears at the bivariate processor 23 may have to coincide with the onset of a symbol period in the FDM signal as processed by the pre-processor 21.

To effect this synchronization, high and low marker tones $f_H$ and $f_L$ are added at summing means 17 to the received signal. The frequency of the high marker tone $f_H$ is above the bandwidth of the FDM signal and the frequency of the low marker tone $f_L$ is below the FDM signal bandwidth. The spacing of the marker tones is selected as a compromise between minimizing the fraction of system bandwidth which is added by the marker tones and avoiding interference with the signal contents by the spreading of the marker tones.

The marker tones $f_H$ and $f_L$ are applied using an on-off modulator 19 which alternately outputs one marker tone and then the other. Modulator 19 is synchronized with some time-based characteristic of the incoming signal, such as symbol period onset.

A signal post-processor 25 is provided, as necessary, to convert the output of the bivariate processor 23 to TDM. An amplitude detector 27 samples and determines the amplitudes of marker pulses corresponding to the marker tones $f_H$ and $f_L$. These amplitudes are compared by a comparator 29 to yield a discriminate which regulates a timing generator 31. The timing generator 31 synchronizes the trigger 33 for the function generator 37 to ensure proper synchronization of signal and function at the bivariate signal processor 23.

This implementation of the present invention is general, and the intended signal output can be either at 39 or 41 or both. The pre-processor 21 is added for generality and is not present in all embodiments of the present invention.

Figure 2:
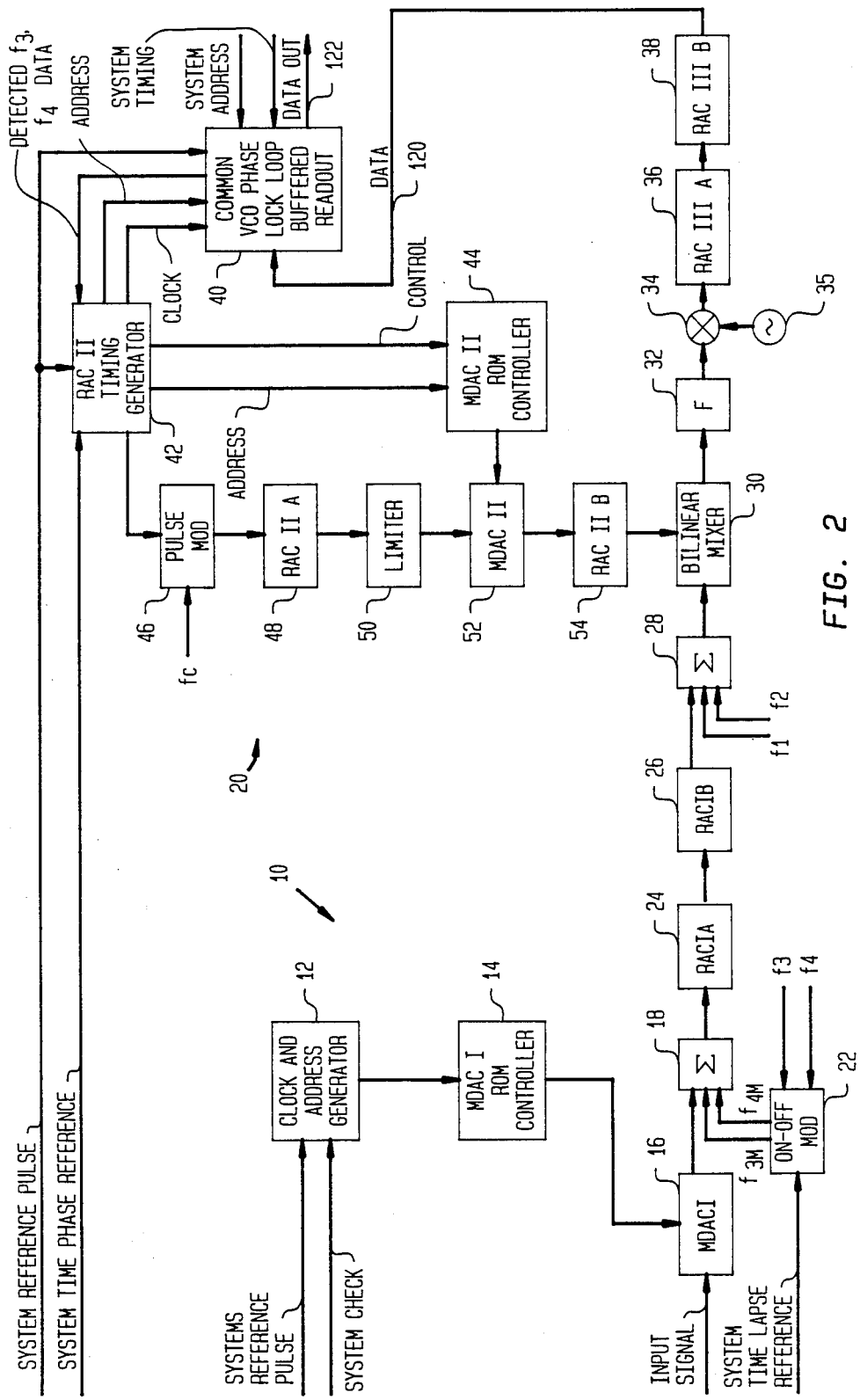
FIG. 2 is a block diagram of a SAW demodulator employing corrective feedback in accordance with the present invention.

Another, and, more specific, embodiment of the present invention is illustrated in FIG. 2, wherein a spectrum analyzer in the form of a demodulator includes first and second frequency delay dispersion sections respectively defined by corresponding pairs of RACs 24 26 and 36, 38. The RACs in each pair thereof 24, 26 and 36, 38 are in series with each other and each provides one-half of the total desired time dispersion delay over the full bandwidth of the input signal, with the result that two RACs in series yield the full desired time dispersion delay over the full bandwidth. The depicted demodulator further includes a calibration section 10, a frequency sweep generator 20, a bilinear mixer 30, a temperature compensating buffered readout 40 and a timing signal generator 42.

The demodulator functions to convert an input in the form of FDM signals to "data out" in the form of TDM signals. The calibration section 10 functions to compensate for distortions introduced by the components of the demodulator and particularly the second dispersion section consisting of RACs 36, 38.

The demodulator depicted in FIG. 2 is a component of an incorporating communications system that assists in synchronizing the action of the address generator 12 and the timing generator 42 which controls the frequency sweep generator 20 with the onset of symbol periods of the incoming signal.

The calibration section 10 includes a complex multiplier 16 for multiplying the incoming signal by a calibration function in the form of a series of complex digital words. The calibration function is stored in a read only memory (ROM) 14. The calibration function data is read out from memory 14 and delivered to the multiplier 16 in response to address signals produced by an address generator 12, which is driven by system reference pulses and system check signals.

The incoming FDM signals are more specifically characterized as multiplexed frequency shift keyed (MFSK) signals within a predetermined frequency range, e.g., a 50 MHz range between 200 MHz and 300 MHz. Within this range are included a multitude, e.g., 1000, narrow band channels, each assignable to a frequency shift keyed (FSK) signal. Each FSK channel carries a stream of binary data at a predetermined common baud rate. All channels switch from one bit or symbol to the next simultaneously.

In response to cues from the incorporating communications system, the timing generator 42, which is controlled by the synchronizer provided by the present invention and detailed below, fires a pulse modulator 46 once every symbol period. The pulse modulator 46 modulates a carrier frequency $f_c$ in accordance with the timing signals received from the timing generator 42. Each pulse includes a spectrum of frequency components over the desired sweep range, which is twice the frequency range of the incoming signal.

In addition to the pulse modulator 46, the frequency sweep generator 20 includes a first RAC 48, a complex multiplier 52 and a second RAC 54. The RACs 48 and 54 are analog signal dispersers which introduce differential delays in signals conveyed therethrough; these delays are monotonic functions of frequency. The RACs 48 and 54 are designed to cooperate to produce the desired sweep form. In the illustrated system, the desired form is a linear sweep; accordingly, both RACs 48 and 54 have nominally linear dispersion patterns.

The first RAC 48 disperses the pulses according to a linear function of frequency. The differences between the maximum delay and the minimum delay introduced is equal to, or slightly less than, the period of the pulse modulator 46. This dispersion is not so great as to cause overlapping of successive pulses.

The complex multiplier 52 is a signal processor which serves to post-modulate the rough sweep output of the first RAC 48 and pre-modulate the input of the second RAC 54 to compensate for non-linearities and attain the desired sweep form. The frequency sweep generator 20 converts each pulse into a linear sweep with a maximum differential delay of twice the symbol period.

The complex multiplier 52 introduces a time varying transfer function to the dispersed pulse and comprises a radio frequency multiplying digital-to-analog converter (MDAC). More specifically, the complex multiplier 52 multiplies the analog signal with a succession of complex digital words, each including a sign bit. This allows modification of the amplitude and phase of the incoming signal as a function of time. A limiter 50 is inserted between the first RAC 48 and the complex multiplier 52 to equalize the amplitudes as a function of frequency of the multiplier inputs.

Figure 4:
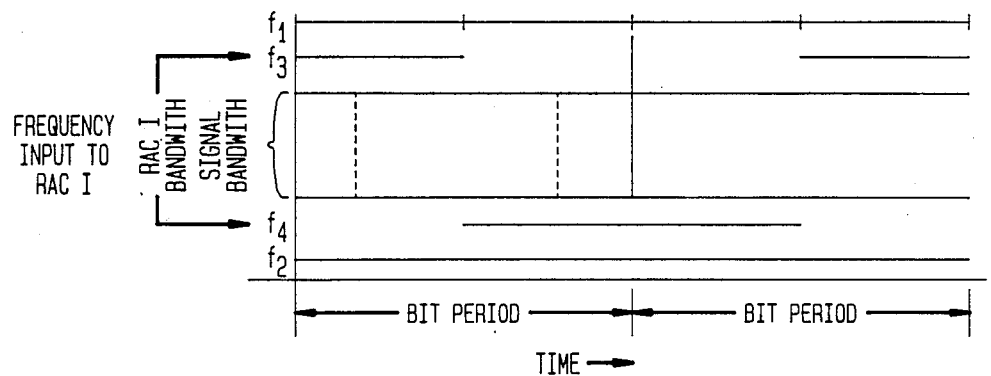
FIG. 4 is a time-frequency waveform chart showing the input FDM signal in relationship to the marker and tracking frequencies.

The incoming signal to the spectrum analyzer is received by the complex multiplier 16 which forms a portion of the calibration section 10. The FSK signals are appropriately modified by the calibration section 10 and are then delivered to a summer 18 where they are combined with a pair of pulse-tracking marker tones $f_3$ and $f_4$. The marker tones $f_3$ and $f_4$ are modulated by a modulator 22 in accordance with a system time lapse reference signal. As shown in FIG. 4, marker tones $f_3$ and $f_4$ are respectively immediately above and below the signal bandwidth of the FSK signals and define the bandwidth of the first analog dispersion section which comprises RACs 24 and 26.

The RACs 24 and 26 function to introduce differential delays as a function of frequency into the incoming signal. The same purpose could be served by a single RAC, a sequence of RACs, or other dispersion filters. The delay introduced at the low end of the incoming signal's frequency range is one symbol period longer than the delay introduced into the high end of the frequency range. The RACs 24 and 26 are nominally linear so that the delays introduced at intermediate frequencies are readily determined by interpolation.

The segments of the incoming signal are staggered by the RACs 24, 26 and these staggered components are combined at a summer 28 with a second pair of marker frequencies $f_1$ and $f_2$ which perform a function auxiliary to the present invention and are at frequencies outside the pass band of RACs 24 and 26.

The staggered components of the marked FSK signals are mixed with the output of the frequency sweep generator 20 at the bilinear mixer 30. A post mixer filter 32 eliminates the sum term from the mixing, so that only the difference term of the product progresses through the system. A local oscillator 35 generates a translation signal $f_s$ for centering the frequency range of the series of sweeps on the center frequency range of the pass band of the second analog frequency dispersion section which comprises RACs 36 and 38. The translation signal $f_s$ is mixed with the series of sweeps at a second mixer 34.

Figure 5:
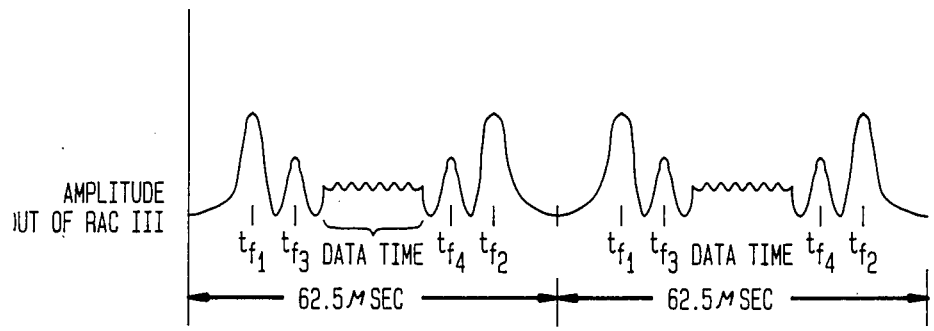
FIG. 5 is a time-amplitude waveform chart showing the output of the second dispersion section.

RACs 36 and 38 introduce delays as nominally linear functions of frequency into the through-going signal. RACs 36, 38 serve to "stand-up" or compress each sweep into a pulse. As shown in FIG. 5, the output of the RACs 36, 38 is a series of pulses, each pulse corresponding to a sweep and hence to one of the original FSK channels. The marker tones $f_3$ and $f_4$ are defined by a pair of pulses $t_{f3}$ and $t_{f4}$ respectively on opposite sides of the data pulses and having amplitudes greater than the data pulses. Similarly, the marker tones $f_1$ and $f_2$ are defined by pulses $t_{f1}$ and $t_{f2}$ respectively outside the tracking frequency pulses $t_{f3}$ and $t_{f4}$ and possess amplitudes greater than these latter pulses.

Figure 3:
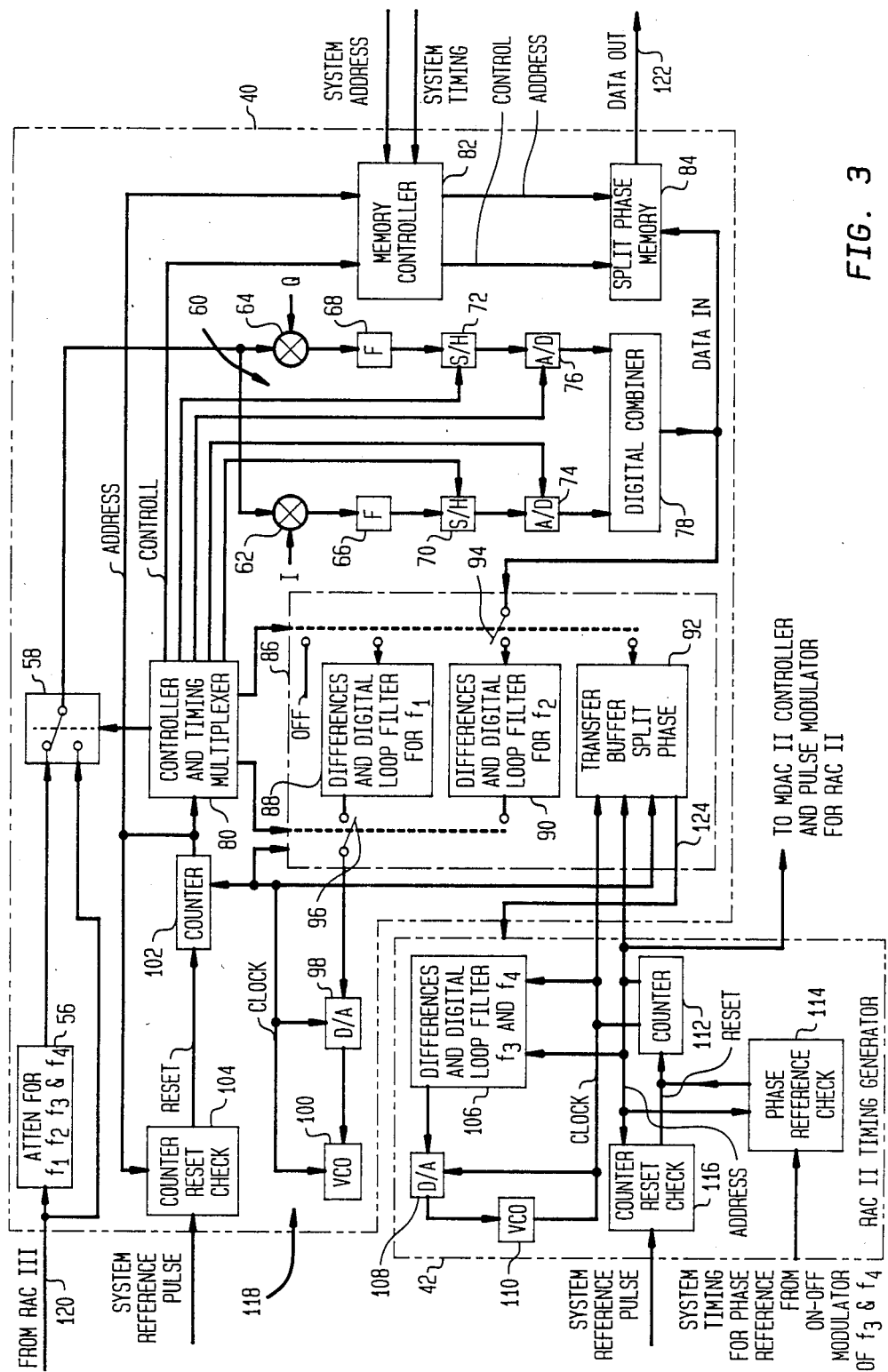
FIG. 3 is a block diagram of the temperature compensating readout circuit and timing generator employed in the SAW demodulator of FIG. 2.

Referring now also to FIG. 3, the temperature compensating buffered readout 40 receives the data output from RAC 38 on a data input line 120 and outputs this data at the system clock rate on a data output line 122. The readout functions to direct, at the proper time, the amplitude of the resulting data pulses along line 120 and then store this information in a split phase memory 84 until the data can be read out at the system clock rate for subsequent use in system calculation. Components at 46, 48, 60–104 and 118–122 cooperate with marker tones $f_1$ and $f_2$ to accomplish the foregoing.

The readout 40 broadly includes an attenuator 56, a digitally controlled switch 58, a convertor circuit 60, a controller and timing multiplexer 80 and a phase-locked loop 118. The incoming signals on line 120 are delivered through the attenuator 56 which is activated by the pulses from the marker tones $f_1$, $f_2$, $f_3$ and $f_4$ in order to reduce these signals to the same range as the signal level expected during the data time FIG. 5. Attenuation of these signals reduces the dynamic range requirement of analog-to-digital convertors 74, 76.

The incoming signal is delivered to the convertor 60, which includes in-phase and quadra-phase (I, Q) translates 62, 64 that translate pulses to a frequency close to base band. The I and Q components of the signals are then through filters 66, 68, respectively, which filter out the upper sidebands.

A pair of sample and hold (S/H) units 70, 72 hold the filtered signal for a fraction of the orthogonal spacing to provide a constant signal level for use in A/D converters 74, 76 which convert analog signal samples into an eight bit digital words. The sample time is determined by the controller and timing multiplexer 80. Controller and timing multiplexer 80 receives timing signals from a counter 102 forming a portion of the phase-locked loop 118.

The digitized signal output from the converter 60 is then processed by a digital combiner 78. The digital combiner 78 performs a square root of the sum of the squares function on the digital I, Q signals, thereby forming the amplitude of the envelope of the signal at the sample time.

The data and marker pulses output by the digital combiner 78 are delivered to a split phase memory 84, as well as to the signal input of a digital processing circuit 86. These pulses are selectively delivered to either one of the filters 88, 90 or to a split phase transfer buffer 92 via a switch 94.

The timing generator 42 includes a phase-locked loop formed by a difference and digital loop filter 106, a D/A convertor 108 and a VCO 110. The timing generator 42 also includes a counter 112 which drives the phase-locked loop, along with a reset check counter 116 and a phase reference checker 114. The counter 112 outputs a count which is employed by the memory controller 82 to address the split phase transfer buffer 92, to address the ROM 44, and to fire the pulse modulator 46.

The phase-locked loop of the timing generator 42 receives its error signal from the digital processor 86, as data read from the split phase transfer buffer on line 124. The discriminate that produces this error signal is generated by forming the discriminate over two cycle times of the demodulator from the marker pulses $t_{f3}$ and $t_{f4}$, the TDM transforms of the FDM marker tones $f_3$ and $f_4$. From FIG. 5, it may be seen that the discriminate is formed by:

$$(t_{f3}(E)-t_{f4}(E))-(t_{f3}(O)-t_{f4}(O))$$

where "E" and "O" refer to the odd and even counts of the counter 112.

Since the amplitude of the $t_{f3}$ and $t_{f4}$ pulses are read by the readout 40, the loop bandwidth of the phase-locked loop of the timing generator 42 should be an order of magnitude smaller than the loop bandwidth of the phase-locked loop 118 due to the fact that these are coupled phase-locked loops.

The counter 112 sets up timing windows when a pulse is expected to be received from the system timing, in order to establish the expected time of commencement of the pulse which is delivered to the pulse modulator 46. If the system timing pulse is not received during this window time, then the next time the system pulse does in fact arrive, it actuates the reset check counter 116, which in turn, resets the counter 112 to the center of the window and causes the pulse modulator 46 to fire. Counter 112 is not reset by the system pulse so long as the system pulse arrive during the window time. The phase information of the modulation on the marker tones $f_3$ and $f_4$ results in a similar reset relative to the even and odd counts.

Figure 6:
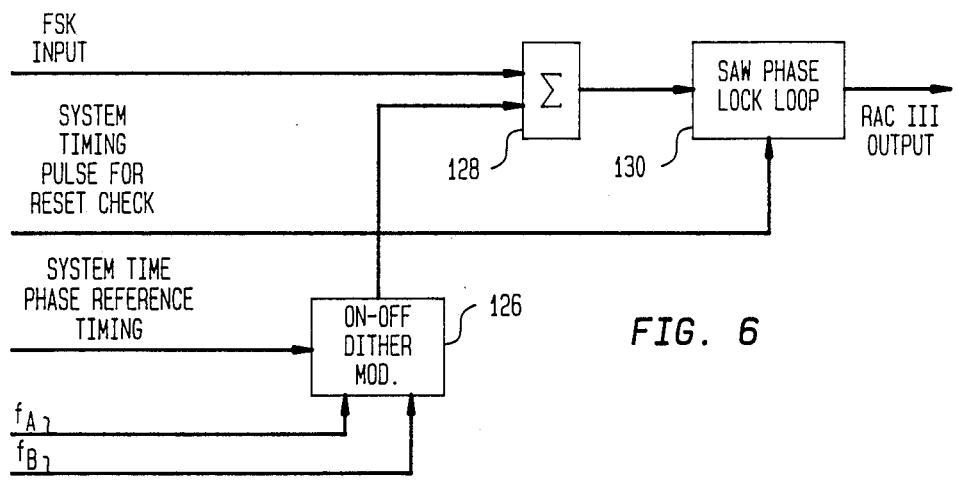
FIG. 6 is a block diagram of an arrangement for injecting a single pair of dither modulated timing tones into the through-going signal.

In an alternative embodiment, the system time phase reference signal is modulated in an on-off manner by the modulator 126 using the synchronization tones $f_A$, $f_B$, as shown in FIG. 6. The synchronization tones $f_A$, $f_B$ output by the modulator 126 are combined with the FSK input signals by the summer 128. The summed output from summer 128 drives a phase-locked loop 130 which functions in a manner similar to the phase-locked loop 118 (FIG. 2) previously described. The output of the phase-locked loop 130 is employed to generate an error signal which drives the timing generator 42 (FIGS. 2 and 3).

Figure 7:
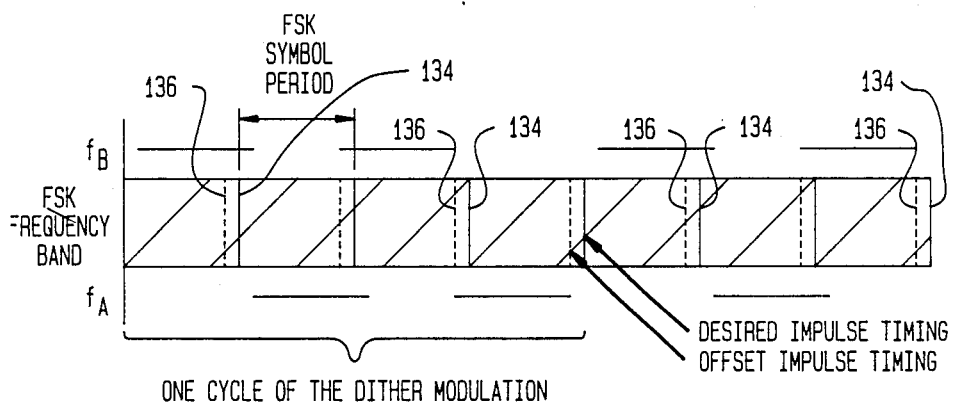
FIG. 7 is a time-frequency waveform chart showing the relationship between the injected, dither modulated tones and the FSK frequency band.

FIG. 7 depicts the signal output from summer 128 and shows the relationship between the dither modulated injected tones $f_A$, $f_B$ and the band of frequencies occupied by the FSK signal. The solid vertical lines 134 in FIG. 7 indicate the boundary between successive FSK signals, which is the desired location of the timing signals delivered to the timing generator 42 referred back to the input timing. The broken vertical lines 136 indicate an impulse timing which is offset from the desired location.

Figure 8:
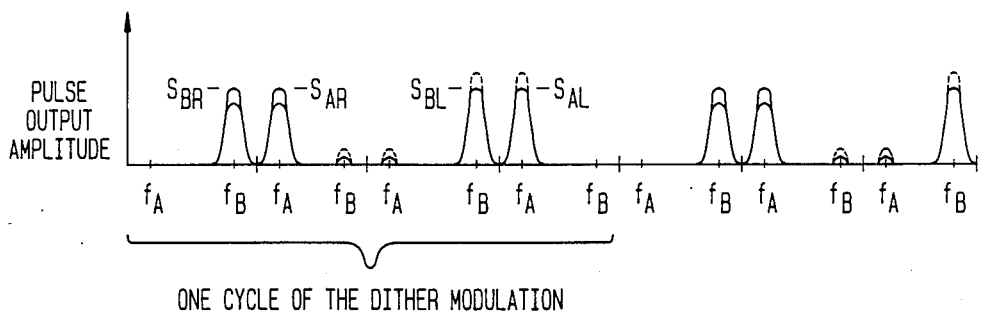
FIG. 8 is a time-amplitude waveform chart showing the pulses output from the second dispersion section, using the dither modulation arrangement in FIG. 7.

FIG. 8 depicts the envelopes of the pulses output from the second dispersion section, i.e. line 120 in FIG. 2, resulting from the dither modulated injected tones $f_A$, $f_B$, wherein the solid waveform lines indicate the pulses obtained from correct impulse timing and the broken waveform lines indicate the pulses obtained from the offset impulse timing.

Using the amplitudes $S_{AR}$, $S_{BR}$, $S_{AL}$, $S_{BL}$, of the pulses shown in FIG. 8, a discriminate is formed which is defined by:

$$S_E = S_{AR} + S_{BR} - S_{BL} - S_{AL}$$

In the case of correct pulse timing, the amplitudes of these four pulses are equal, consequently $S_E$ equals zero. However, in the case of the indicated offset impulse timing, $S_{AR}$ equals $S_{BR}$ and $S_{AL}$ equals $S_{BL}$, but $S_{AR}$ and $S_{BR}$ are greater than $S_{AL}$ and $S_{BL}$, since $S_{AR}$ and $S_{BR}$ are present with the sweep of the frequency sweep generator 20 for a greater period of time than are $S_{AL}$ and $S_{BL}$; consequently, $S_E$ is greater than zero. Similarly, if the impulse timing is offset in the opposite direction, $S_{AR}$ equals $S_{BR}$, $S_{AL}$ equals $S_{BL}$, but $S_{AR}$ and $S_{BR}$ are less than $S_{AL}$ and $S_{BL}$; consequently, $S_E$ is less than zero.

Thus, $S_E$ is a discriminate employed by the phase-locked loop 130 for synchronizing the operation of the timing generator 42 to the FSK signal. Since the dithered tones $f_A$, $f_B$ are present during virtually the entire symbol segment, the response of RACs 36, 38 to these signals is narrower than that described in the previous demodulator embodiment.

In other words, the pulses output from the second dispersion section as a result of the injection of the dither modulated tones $f_A$, $f_B$ are relatively narrow compared to the pulses generated through the use of marker tones $f_3$ and $f_4$ employed in the embodiment of FIGS. 2 and 3. In fact, the pulses output from the second dispersion section are similar to the pulses generated by the marker tones $f_1$, $f_2$ except that they are slightly amplitude modulated and occur at one-half the previous frequency. In any event, the dither modulating arrangement shown in FIG. 6 can be satisfactorily employed in combination with the temperature compensating readout circuit shown in FIG. 3, thereby reducing the overall complexity of the SAW demodulator while increasing the bandwidth available in the demodulator for communication purposes.

As illustrated above, the present invention provides for synchronization of a frequency sweep or other function generated remotely from a signal stream. In addition to the foregoing, many other variations and modifications are provided by the present invention, the scope of which is limited only by the following claims.

What is claimed is:

1. A processor for frequency division multiplexed signals, said processor comprising a frequency division multiplexed signal receiving means, said receiving means having a predetermined bandwidth, said processor being adapted for converting a received frequency division multiplexed signal into a signal being processed and obtaining a desired output at an output means, said processor defining a signal path from said receiving means to said output means, said path including a means for providing an intermediate signal by combining said signal being processed with a second signal originating and being triggered remotely from said signal path, said second signal requiring synchronization with a time-based characteristic of said signal being processed, said processor further comprising:

marker means for adding high and low marker tones to said frequency division multiplexed signal, said high marker tone having a frequency above said bandwidth, said low marker tone having a frequency below said bandwidth, said marker tones being applied alternately and synchronously with said time-based characteristic;

converter means for converting said intermediate signal into a time division multiplexed signal, said time division multiplexed signal comprising a series of segments, each segment including a series of pulses including marker pulses corresponding to said high and low marker tones;

detector means for detecting the amplitudes of said marker pulses;

comparator means for forming discriminates as a function of said amplitudes; and a timing generator for setting the triggering times of said second signal, said timing generator being responsive to said discriminates.

2. The processor of claim 1 wherein said time-based characteristic is the symbol segment duration, said marker tones being synchronized so that each marker tone segment has a duration equal to the symbol segment duration, each marker tone segment being concurrent with half of each of two adjacent symbol segments, each symbol segment being concurrent with half a segment of each of said high and low marker tones, said discriminate being formed by comparing the amplitudes of said marker pulses taken over two adjacent segments of said time division multiplexed signal, each segment of said time division multiplexed signal corresponding to one marked symbol segment of said frequency division multiplexed signal.

3. The processor of claim 1 wherein said time-based characteristic is the symbol segment duration, said marker tones being dithered, each pair of adjacent symbol segments being substantially concurrent with one high tone marker segment and one low tone marker segment, four adjacent symbol segments constituting a complete dither cycle, said discriminate being formed by comparing the amplitudes of said marker pulses, said discriminate being formed from readings of sets of four adjacent time division multiplexed segments, each of said sets of four corresponding to a dither cycle.

4. A method of synchronizing a remotely triggered signal to be used in the processing of a frequency division multiplexed signal comprising the steps of:

receiving a frequency division multiplexed signal having a predetermined bandwidth and being constituted by a series of symbol segments;

adding to said frequency division multiplexed signal high and low marker tones, said high marker tone having a frequency above said bandwidth, said low marker tone having a frequency below said bandwidth, said marker tones being applied in alternation and synchronously with said symbol segments;

processing the marked frequency division signal, said processing including processing resulting from the action of said remotely triggered signal;

converting the processed signal to a time division multiplexed signal;

sampling said time division multiplexed signal to detect the amplitude of marker pulses corresponding to said marker tones;

forming a discriminate based on comparison of the amplitudes of said marker pulses; and adjusting the timing of said remotely triggered signal in response to said discriminate.

5. The method of claim 4 wherein said marker tones are synchronized so that each marker tone segment has a duration equal to the symbol segment duration, each marker tone segment being concurrent with half of each of two adjacent symbol segments, each symbol segment being concurrent with half of a segment of each of said high and low marker tones, said discriminate being formed by comparing the amplitudes of said marker pulses taken over two adjacent segments of said time division multiplexed signal, each segment of said time division multiplexed signal corresponding to one marked symbol segment of said frequency division multiplexed signal.

6. The method of claim 4 wherein said marker tones are dithered, each pair of adjacent symbol segments being substantially concurrent with one high tone marker segment and one low tone marker segment, four adjacent symbol segments constituting a complete dither cycle, said discriminate being formed by comparing the amplitudes of said marker pulses, said discriminate being formed from readings of sets of four adjacent time division multiplexed segments, each of said sets of four corresponding to a dither cycle.

7. A demodulator for converting frequency division multiplexed signals into time division multiplexed signals, said demodulator comprising:

means for receiving a frequency division multiplexed signal constituted by symbol segments and having a predetermined bandwidth;

means for producing a marked frequency division multiplexed signal by adding high and low marker tones to said frequency division multiplexed signal, said high and low marker tones being synchronized to said symbol segments and being applied alternately, said high marker tone having a frequency above said bandwidth, said low marker tone having a frequency below said bandwidth;

means for producing a dispersed marked frequency division multiplexed signal by introducing delays as a function of frequency into said marked frequency division multiplexed signal;

means for generating frequency sweeps, said frequency sweep including a trigger adapted for response to a timing input;

means for producing series of channel sweeps by applying said sweeps to said dispersed marked frequency division multiplexed signal;

means for producing a time division multiplexed signal by introducing delays as a function of frequency into said series of channel sweeps, said time division multiplexed signal being constituted by series of pulses including marker pulses corresponding to said marker tones;

means for sampling and determining the amplitude of said marker pulses;

a comparator for producing a discriminate by comparing amplitudes of said marker pulses; and a timing generator responsive to said discriminate, said timing generator being coupled to said trigger.

8. The demodulator of claim 7 wherein said marker tones are synchronized so that each marker tone segment has a duration equal to the symbol segment duration, each marker tone segment being concurrent with half of each of two adjacent symbol segments, each symbol segment being concurrent with half of a segment of each of said high and low marker tones, said discriminate being formed by comparing the amplitudes of said marker pulses taken over two adjacent segments of said time division multiplexed signal, each segment of said time division multiplexed signal corresponding to one marked symbol segment of said frequency division multiplexed signal.

9. The demodulator of claim 7 wherein said marker tones are dithered, each pair of adjacent symbol segments being substantially concurrent with one high tone marker segment and one low tone marker segment, four adjacent symbol segments constituting a complete dither cycle, said discriminate being formed by comparing the amplitudes of said marker pulses, said discriminate being formed from readings of sets of four adjacent time division multiplexed segments, each of said sets of four corresponding to a dither cycle.

10. A method of synchronizing a frequency sweep in a demodulator for converting frequency division multiplexed signals to time division multiplexed signals, said method comprising the steps of:
receiving a frequency division multiplexed signal having a predetermined bandwidth and symbol segment duration;
producing a marked signal by summing said frequency division multiplexed signal with high and low alternating marker tones, said high marker tone having a frequency higher than said bandwidth, said low marker tone having a frequency lower than said bandwidth;
producing a staggered signal by delaying said marked signal according to a function of frequency;
producing swept signals by operating on said staggered signal with periodic frequency sweeps;
producing a time division multiplexed signal including marker pulses corresponding to said marker tones by compressing said swept signals as a time function of frequency;
detecting said marker pulses and determining their amplitudes;
forming a discriminate by comparing the amplitudes of said marker pulses; and
regulating the timing of said frequency sweeps.

11. The method of claim 10 wherein said marker tones are synchronized so that each marker tone segment has a duration equal to the symbol segment duration, each marker tone segment being concurrent with half of each of two adjacent symbol segments, each symbol segment being concurrent with half of a segment of each of said high and low marker tones, said discriminate being formed by comparing the amplitudes of said marker pulses taken over two adjacent segments of said time division multiplexed signal, each segment of said time division multiplexed signal corresponding to one marked symbol segment of said frequency division multiplexed signal.

12. The method of claim 10 wherein said marker tones are dithered, each pair of adjacent symbol segments being substantially concurrent with one high tone marker segment and one low tone marker segment, four adjacent symbol segments constituting a complete dither cycle, said discriminate being formed by comparing the amplitudes of said marker pulses, said discriminate being formed from readings of sets of four adjacent time division multiplexed segments, each of said sets of four corresponding to a dither cycle.

* * * * *